(No Model.)
H. J. MEYER.
SPOON.
No. 283,634. Patented Aug. 21, 1883.
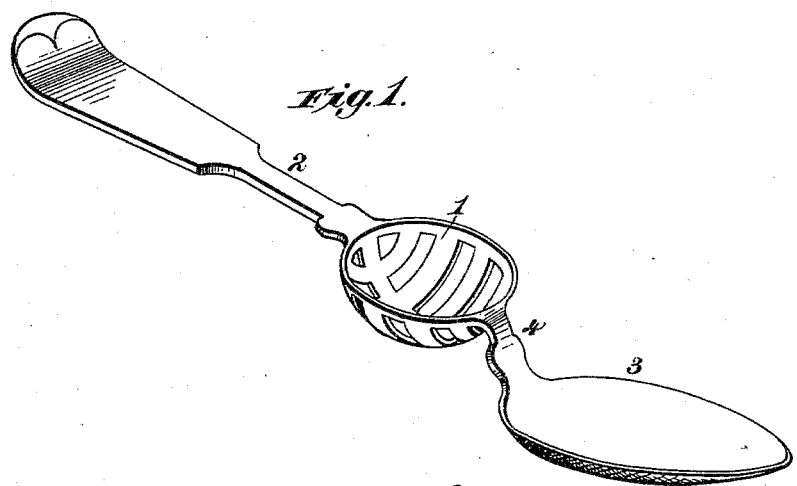
Fig. 1.
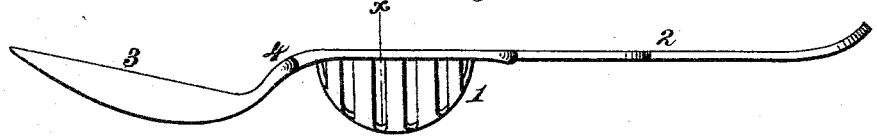
Fig. 2.
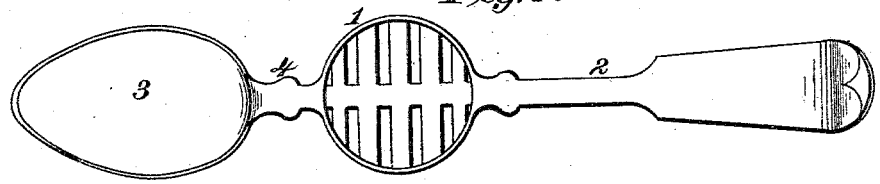
Fig. 4.
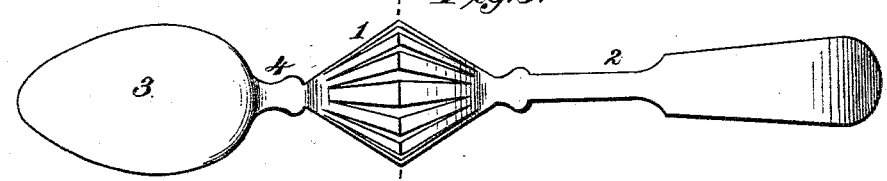
Fig. 5.
Fig. 3. 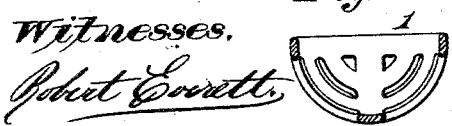 Fig. 6. 
Witnesses.
Robert Everett
J. A. Rutherford
Inventor.
Henry J. Meyer.
By James L. Norris.
Atty.

UNITED STATES PATENT OFFICE.

HENRY J. MEYER, OF FORT WAYNE, INDIANA.

SPOON.

SPECIFICATION forming part of Letters Patent No. 283,634, dated August 21, 1883.

Application filed May 1, 1883. (No model.)

*To all whom it may concern:*

Be it known that I, HENRY J. MEYER, a citizen of the United States, residing at Fort Wayne, in the county of Allen and State of Indiana, have invented new and useful Improvements in Spoons, of which the following is a specification.

This invention has for its object to provide a spoon of novel construction, which is provided with a receptacle for receiving and holding seeds, kernels, or other parts of fruits—such as cherries, plums, and grapes—whereby such seeds, &c., are retained in a part of the spoon outside of the usual bowl thereof, and it is not essential to supply a separate plate on the table for receiving the seeds, &c., and at the same time the latter need not be placed in the bowl from which the fruit is eaten.

The object of my invention I accomplish in the manner illustrated in the accompanying drawings, in which—

Figure 1 is a perspective view of a spoon constructed in accordance with my invention; Fig. 2, a side elevation of the same; Fig. 3, a transverse sectional view, taken on the line $x$ $x$ of Fig. 2; Fig. 4, a plan view of the spoon; Fig. 5, a rear plan view of a spoon, showing a modification in the construction of the receptacle for the seed, &c.; and Fig. 6 a transverse sectional view on the line $y$ $y$, Fig. 5.

In carrying out my invention I provide a spoon of ordinary or any desired construction, with a receptacle, number 1, for receiving seeds, kernels, or other parts of fruit eaten from the bowl. As here shown, this receptacle is formed with the handle 2 of the spoon, and is located in proximity to the inner edge of the bowl 3, the latter being joined to the receptacle by a neck or stem, 4. The form of the receptacle is not material; but in order to provide an æsthetic appearance I construct the receptacle with a reticulated, slotted, or other open-work bottom wall, and as shown in Figs. 1, 2, 3, and 4, the receptacle is semicircular, while in Figs. 5 and 6 it is angular in section.

The cavity forming the receptacle may be struck up from the same piece of metal composing the bowl and handle; or it may be separately constructed, and connected with the bowl and handle in any suitable manner, and it may be located entirely at one side of the handle, instead of centrally in line therewith, as shown.

A spoon constructed in accordance with my invention not only presents an attractive and novel appearance, but is useful in that when eating fruit from the bowl the seeds, kernels, or parts of the fruit—such as cherries, plums, grapes, and other fruits—can be deposited and retained in the receptacle without the necessity of using a separate plate on the table for this purpose, and without depositing the same in the bowl of the spoon from which the fruit is eaten.

I am aware that prior to my invention a medicine-spoon has been made of a handle having at one end a tea-spoon bowl and at the other extremity a table-spoon bowl; but such is not my construction and arrangement, and is not claimed by me.

Having fully described my invention, what I claim is—

1. As an improved article of manufacture, a spoon for table use composed of the bowl 3, handle 2, and an additional receptacle, 1, arranged adjacent to one edge of the usual bowl, to leave the entire spoon-handle projecting free, to be held by the handle, with the bowl and receptacle at one side of the hand, substantially as shown.

2. A spoon for table use, consisting of the bowl 3, the handle 2, and the additional receptacle 1, arranged adjacent to one edge of the bowl, between the handle 2 and the said bowl, substantially as shown and described.

In testimony whereof I have hereunto set my hand and seal in the presence of two subscribing witnesses.

HENRY J. MEYER. [L. S.]

Witnesses:
AUSTIN A. TYLER,
FRED. C. SPIEGEL.